DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 8, 1973

910 O.G. 408

T910,006

METHODS FOR PREPARATION OF INSULATION MATERIALS FROM ALUMINA-SILICA FIBERS

Leonard J. Schuman, Parsippany, Richard P. Brookman, Ridgewood, and Raymond T. Ertle, Pompton Plains, N.J., assignors to Continental Oil Company, Ponca City, Okla.

Filed Jan. 6, 1972, Ser. No. 215,921
Int. Cl. D21h *3/66*
U.S. Cl. 162—152
No Drawing. 6 Pages Specification

An improved method for preparing insulation material from alumina-silica fibers which comprises contacting said fibers with an aqueous binder solution containing dispersible alumina and halogenated organic acid in the amounts of 8–12 wt. percent and 0.8–1.2 wt. percent based on the weight of the solution respectively and said halogenated organic acid is monochloroacetic acid.